United States Patent
Muhle et al.

(10) Patent No.: US 6,180,736 B1
(45) Date of Patent: *Jan. 30, 2001

(54) HIGH ACTIVITY METALLOCENE POLYMERIZATION PROCESS

(75) Inventors: Michael E. Muhle, Kingwood; George Alan Vaughan, Houston, both of TX (US)

(73) Assignee: Exxon Chemical Patents Inc, Houston, TX (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/992,521

(22) Filed: Dec. 17, 1997

Related U.S. Application Data

(60) Provisional application No. 60/033,687, filed on Dec. 20, 1996.

(51) Int. Cl.[7] ............................................. C08F 4/42
(52) U.S. Cl. ........................ 526/160; 526/901; 526/943
(58) Field of Search ................................ 526/160, 943, 526/901; 556/53

(56) References Cited

U.S. PATENT DOCUMENTS

| | | |
|---|---|---|
| 4,808,561 | 2/1989 | Welborn . |
| 4,871,705 | 10/1989 | Hoel . |
| 5,017,714 | 5/1991 | Welborn, Jr. . |
| 5,162,278 | 11/1992 | Razavi . |
| 5,223,467 | 6/1993 | Razavi . |
| 5,317,036 | 5/1994 | Brady, III et al. . |
| 5,324,801 | 6/1994 | Brekner et al. . |
| 5,329,031 * | 7/1994 | Miyake et al. .................. 556/12 |
| 5,350,817 | 9/1994 | Winter et al. . |
| 5,374,700 | 12/1994 | Tsutsui et al. . |
| 5,405,922 | 4/1995 | DeChellis et al. . |
| 5,416,153 | 5/1995 | Winter et al. . |
| 5,416,179 | 5/1995 | Welch et al. . |
| 5,416,228 | 5/1995 | Ewen et al. . |
| 5,466,766 | 11/1995 | Patsidis et al. . |
| 5,541,272 * | 7/1996 | Schmid et al. .................. 526/160 |
| 5,571,880 * | 11/1996 | Alt et al. ........................ 526/160 |
| 5,585,508 * | 12/1996 | Kuber et al. .................... 556/11 |
| 5,594,078 | 1/1997 | Welch et al. . |
| 5,728,640 | 3/1998 | Lu et al. . |
| 5,780,659 * | 7/1998 | Schmid et al. .................. 556/11 |

FOREIGN PATENT DOCUMENTS

| | | |
|---|---|---|
| 2093056 | 3/1993 | (CA) . |
| 0 129 368 A1 | 12/1984 | (EP) . |
| 0 277 004 A1 | 8/1988 | (EP) . |
| 0 419 677 A1 | 4/1991 | (EP) . |
| 0 573 403 A2 | 12/1993 | (EP) . |
| 0 577 581 A2 | 1/1994 | (EP) . |
| 0 588 404 A2 | 3/1994 | (EP) . |
| 0 619 325 A1 | 10/1994 | (EP) . |
| 0 659 773 A1 | 6/1995 | (EP) . |
| 0 668 295 A1 | 8/1995 | (EP) . |
| 0 705 851 A2 | 4/1996 | (EP) . |
| 0 745 607 A2 | 12/1996 | (EP) . |
| 2241244 | 8/1991 | (GB) . |
| 2 303 367 | 2/1997 | (GB) . |
| WO 95/12622 | 5/1995 | (WO) . |

OTHER PUBLICATIONS

Alkyl and Hydride Derivatives of (Pentamethylcyclopentadienyl)zirconium(IV), Wolczanski, et al, Organometallics 1, p. 793–799 (1982).

"Here's The Latest Score On Single–site Catalysts," Schut, Plastics World, p. 41–46 (1996).

"Metallocene Catalysts," Kaminsky, Institut Fur Technische Und Makromolekulare Chemie, (1992).

"Polymerization of Ethylene by Using Zirconocene Catalyst Anchored on Silica with Trisiloxane and Pentamethylene Spacers," Dong–ho Lee, et al, Macromol. Rapid Commun. vol. 18., pp. 427–431, (1997).

* cited by examiner

Primary Examiner—David W. Wu
Assistant Examiner—R. Rabago
(74) Attorney, Agent, or Firm—Gerald D. Malpass; Joseph F. Reidy; Charles E. Runyan

(57) ABSTRACT

The disclosed invention relates to a polymerization process comprising contacting ethylene, and optionally, one or more olefinically unsaturated comonomers, with an active supported Group 3, 4, 5, or 6 metallocene catalyst system having an unsubstituted or substituted fused-ring cyclopentadienyl ligand, preferably indenyl or fluorenyl, and a substituted or unsubstituted cyclopentadienyl ligand under gas-phase or slurry polymerization conditions. The process is suitable for the production of high-density polyethylene homopolymers and copolymers. The benefits to industrial practice are both the ease of preparation and low-cost of the precursor metallocene compound and the commercially feasible polymerization activity levels in stable, low fouling level reactor conditions surprisingly associated with it. Additionally, the polymers made under the invention process conditions have narrow molecular weight distributions, low MI, and low values for MIR.

14 Claims, No Drawings

HIGH ACTIVITY METALLOCENE POLYMERIZATION PROCESS

HIGH ACTIVITY METALLOCENE POLYMERIZATION PROCESS

This nonprovisional application is based on provisional application 60/033,687, filed Dec. 20, 1996.

FIELD OF THE INVENTION

This invention relates to a polymerization process for ethylene polymers utilizing specific supported biscyclopentadienyl metallocenes.

BACKGROUND OF THE INVENTION

Metallocene-catalyzed polymerization processes are well known in the art. Such processes employ catalyst systems which utilize metallocene compounds for the polymerization of olefinically unsaturated olefins. Metallocene compounds are defined as organometallic coordination compounds obtained as cyclopentadienyl derivatives of a transition metal. Processes which employ multiple metallocenes in a single polymerization reactor are also known. Bridged and unbridged biscyclopentadienyl Group 4 metal compounds are particularly representative; many are said to be useful for gas-phase polymerization or slurry polymerization where the use of supported catalysts is typical. For example, U.S. Pat. No. 4,808,561 describes a process for the polymerization of ethylene and other olefins, and particularly homopolymers of ethylene and copolymers of ethylene and higher alpha-olefins and/or diolefins and/or cyclic olefins in the presence of a metallocene catalyst.

European Patent Application 0 659 773 describes a gas phase process for producing polyethylene employing at least one bridged metallocene catalyst, and optionally, one or more second catalysts which may be non-bridged metallocene catalysts. In Examples $6^c$ and $7^c$ diphenylmethylene (cyclopentadienyl)(fluorenyl) zirconium dichloride was utilized to produce polymers having densities of 0.928 and 0.920, respectively, and MFR's of 47 and 37, respectively.

U.S. Pat. No. 5,324,801 describes a process for the preparation of a cycloolefin copolymer using specific metallocenes having mononuclear or polynuclear hydrocarbon radicals which are able to form a sandwich compound with the central metal atom. The mononuclear or polynuclear hydrocarbon radicals are linked by a single- or multi-membered bridge.

European Patent Application 0 619 325 describes the preparation of polyolefins having a multimodal or at least bimodal molecular weight distribution using a catalyst system comprising, inter alia, at least two metallocenes containing the same transition metal and selected from mono, di, and tri-cyclopentadienyls and substituted cyclopentadienyls of a transition metal wherein at least one of the metallocenes is bridged and at least one is unbridged. Preferably, the unbridged metallocene is a bis (cyclopentadienyl) zirconium dichloride. In Table 1, ethylene polymers having HLMI/MI$_2$ ratios greater than 38 and densities ranging from 0.9408 and 0.9521 are reported. Activities ranging from 662 to 1126 g/g.h are reported.

U.S. Pat. No. 5,405,922 describes a gas phase polymerization process for polymerizing olefins utilizing a metallocene in a gas phase fluidized bed polymerization reactor operating in a condensed mode. In Tables 1–4, ethylene polymers having densities ranging from 0.9168 to 0.9222 g/cc are reported.

PCT publication WO 95/12622 reports in Examples 1–7 and Table 1 polymerization results for catalysts employing bis(cyclopentadienyl) zirconium dichloride or bis(indenyl) zirconium dichloride.

While metallocene-catalyzed ethylene polymerization processes are well known in the art, certain problems with these processes remain. Metallocenes, compared to transition metal halide polymerization catalysts, are expensive materials. If the metallocene catalyst productivity is too low, the process will not be economical. This problem is aggravated when metallocene-catalyzed processes are used to make higher density ethylene polymers, such as medium density ethylene/α-olefin copolymers (MDPE), or high density ethylene/α-olefin copolymers and homopolymers (HDPE), because metallocene catalysts, like other catalysts, generally exhibit lower catalyst productivity under HPDE or MDPE polymerization conditions in comparison with low density conditions. The magnitude of the activity loss under MDPE or HDPE conditions is even more severe for metallocene catalysts compared to conventional Ziegler-Natta catalysts.

Moreover, low productivity metallocene processes, like other low productivity processes, may suffer from poor operability. In particle-form polymerization processes, such as gas phase and slurry processes, lower catalyst productivity generally results in reduced average particle size (APS) and higher fines levels. Fines are readily carried over into the cycle gas loop of a fluidized-bed gas phase reactor, where can they can foul the cycle gas cooler and the reactor distributor plate, thereby inhibiting effective reactor cooling and bed fluidization. If the fines level becomes excessive, the reactor may become inoperable and require a shut-down and cleaning, resulting in lost production and increased costs.

High fines levels are especially a problem when gas phase processes are used to make HDPE. HDPE, compared to lower density polymers, will generally have more fines, even if the catalyst productivity is comparable to the catalyst productivity in a lower density process. The problem is aggravated even further if the catalyst used to make the HDPE exhibits low productivity under HDPE conditions. Thus, there is still a need for a metallocene-catalyzed ethylene polymerization process that utilizes a simple, inexpensive metallocene and operates with a higher catalyst productivity, especially during the production of HDPE.

In addition, when slurry and gas phase processes are used to make ethylene/α-olefin copolymers of a given density, it is desirable to use a catalyst that exhibits superior a-olefin incorporation. Catalysts exhibiting superior α-olefin incorporation require that, for a given reactor concentration of ethylene, less α-olefin need be present in the process to achieve a given polymer density. For example, a highly incorporating catalyst can produce a low density polyethylene with a low ratio of α-olefin/ethylene reactants. This is advantageous because a higher concentration of α-olefin produces a higher concentration of dissolved α-olefin in the polymer particles, rendering the particles sticky and prone to agglomeration, chunk formation, and fouling. The problem becomes especially acute when polymers having densities below about 0.915 g/cc are produced. Further, for gas phase processes operating in condensed mode, as described for example in U.S. Pat. No. 5,462,999 and U.S. Pat. No. 5,405,922, it is especially desirable to minimize the concentration of α-olefin necessary to achieve a given polymer density. The ability to use less α-olefin permits higher levels of condensed liquid to be employed in condensed mode operation, which in turn permits higher production rates.

Thus, there is still a need for a metallocene-catalyzed ethylene polymerization process that produces polymers of a given density using the lowest possible level of α-olefin comonomer.

Finally, it would be highly desirable to have a metallocene-catalyzed ethylene polymerization process that meets the above needs and at the same time provides products having the expected beneficial characteristics of metallocene-catalyzed products, especially narrow molecular weight distribution as indicated by a low ratio of HLMI/MI.

SUMMARY OF THE INVENTION

The invention comprises a polymerization process comprising contacting, under gas-phase or slurry polymerization conditions, ethylene; optionally, one or more comonomers; and a metallocene or mono-metallocene catalyst system which comprises a support material and a catalytic complex formed by activating a Group 3, 4, 5, or 6 biscyclopentadienyl metallocene, wherein said biscyclopentadienyl metallocene has one fused-ring cyclopentadienyl ligand, preferably indenyl, and a mono-cyclopentadienyl ligand. In a preferred embodiment the biscyclopentadienyl metallocene is unbridged. The benefits to industrial practice are both the ease of preparation and low-cost of the biscyclopentadienyl metallocene compound and the commercially feasible polymerization activity levels in stable, fouling free reactor conditions surprisingly associated with it. Additionally, the polymers of the inventive process have narrow molecular weight distributions as indicated by low values for MIR. In a preferred embodiment, the process further comprises adjusting the comonomer to ethylene ratio in the polymerization process to produce a polymer having a density greater than about 0.925 g/cc.

DETAILED DESCRIPTION OF THE INVENTION

In this patent specification, references to the elemental groups will be made in accordance with the new IUPAC nomenclature for the Periodic Table of Elements, as described in *Chemical and Engineering News*, 63(5) 27, (1985). Under this convention the groups are numbered 1 to 18.

According to the present invention there is provided an ethylene polymerization or copolymerization process exhibiting unexpectedly high catalyst productivity, especially under MDPE and HDPE polymerization conditions, and unexpectedly good incorporation of comonomers, while at the same time providing products which have narrow molecular weight distributions.

In one embodiment, the process of the invention comprises contacting, under gas-phase or slurry polymerization conditions, a) ethylene; b) optionally, one or more comonomers; and c) a metallocene catalyst system comprising i) a support material and ii) a catalytic complex formed by activating a Group 3, 4, 5, or 6 biscyclopentadienyl metallocene, wherein said biscyclopentadienyl metallocene comprises an unsubstituted or substituted fused-ring cyclopentadienyl ligand and an unsubstituted or substituted mono-cyclic cyclopentadienyl ligand.

In another embodiment, the process of the invention comprises contacting, under gas-phase or slurry polymerization conditions, a) ethylene; b) optionally, one or more comonomers; and c) a mono-metallocene catalyst system comprising i) a support material and ii) a catalytic complex formed by activating a Group 3, 4, 5, or 6 biscyclopentadienyl metallocene, wherein said biscyclopentadienyl metallocene comprises an unsubstituted or substituted fused-ring cyclopentadienyl ligand and an unsubstituted or substituted mono-cyclic cyclopentadienyl ligand.

In other embodiments, the inventive process is directed toward copolymerization and comprises contacting ethylene, one or more comonomers, and the metallocene or mono-metallocene catalyst. In an additional embodiment, the polymerization conditions are gas phase conditions. In still another embodiment; the polymerization conditions are slurry conditions. In yet another embodiment, the biscyclopentadienyl metallocene is a Group 4 metallocene comprising an unsubstituted or substituted fused-ring cyclopentadienyl ligand and an unsubstituted or substituted mono-cyclic cyclopentadienyl ligand. In a preferred embodiment the biscyclopentadienyl metallocene is a Group 4 metallocene comprising an unsubstituted or substituted indenyl group and an unsubstituted or substituted cyclopentadienyl group.

As defined herein, a "mono-metallocene catalyst system," as distinguished from a "metallocene catalyst system," means a catalyst system wherein all of the catalytic complexes present in the polymerization process are formed by the reaction of one or more activators with substantially a single metallocene. The phrase "substantially a single metallocene" means that the metallocene need not be 100% pure, and it may contain up to 15 mole % of one or more different metallocenes, which may be formed in separate syntheses and added, or which may be formed as a by-products of the synthetic scheme employed. For the purposes of this patent specification, metallocenes which are isomers having the same empirical formula are considered to be the same metallocene. Mono-metallocene catalyst systems may comprise other non-metallocene species or adjuvants, such as for example anti-static agents or other modifiers, and in any number and amount.

A "metallocene catalyst system" as used herein means that the catalyst system may comprise catalytic complexes formed by one or more metallocenes without limitation as to number or quantity of such metallocenes.

The Group 3, 4, 5, or 6 metallocenes of the inventive process comprise the class of biscyclopentadienyl metallocenes having as the cyclopentadienyl-containing ligands: 1) an unsubstituted or substituted mono-cyclic cyclopentadienyl ligand and 2) an unsubstituted or substituted fused-ring cyclopentadienyl ligand, both pi-bonded to a central Group 3, 4, 5, or 6 metal. The term "fused-ring cyclopentadienyl ligand" means a fused-ring system containing multiple rings, in which at least one of the rings is a cyclopentadienyl ring having at least one other ring fused thereto. The term "fused" is used herein to indicate that a ring has one or more of its sides in common with at least one other ring. The other ring (or rings) may be fused to the cyclopentadienyl ring in a number of modes. Most commonly, it will be joined to the cyclopentadienyl ring in an ortho-fused mode where two adjacent carbon atoms of the cyclopentadienyl ring are each bonded to atoms that are members of the other ring. The other ring may contain a single ring or a plurality of rings, all of which may be, independently, aliphatic or aromatic in nature. For the purposes of this specification and the attached claims, the term "cyclopentadienyl ring" includes 5-membered rings having 5 carbon atoms, or one or more non-carbon atoms from Groups 14 and 15 replacing one or more carbon atoms, the remaining being carbon. Similarly, a non-carbon heteroatom may be substituted for one or more carbon atoms in any ring fused, or connected, to the cyclopentadienyl ring of the fused-ring system containing a cyclopentadienyl ligand.

The term "mono-cyclic cyclopentadienyl ligand" means a substituted or unsubstituted cyclopentadienyl ligand that possesses only a single ring, namely the 5-membered cyclopentadienyl ring itself, with no other rings fused thereto, and it will also be understood to include such 5-membered rings where one or more non-carbon atoms from Groups 14 and 15 replace one or more carbon atoms in the 5-membered ring.

The inventive metallocenes may be either bridged or unbridged. Unbridged metallocenes are those wherein the two pi-bonded cyclopentadienyl-containing ligands are not linked by any bridging groups, and each pi-bonded cyclopentadienyl ring, if severed from the metal atom, would be, or would be contained in, a separate, distinct molecule. Conversely, bridged metallocenes are those wherein the two pi-bonded cyclopentadienyl-containing ligands are linked by bridging groups, and each pi-bonded cyclopentadienyl ring, if severed from the metal atom, would be contained in a single molecule. For the purposes of this specification and the appended claims, the unbridged metallocenes of the inventive process shall be specifically identified as "unbridged" biscyclopentadienyl metallocenes. When the metallocenes of the inventive process are referred to in the specification and in the appended claims as "biscyclopentadienyl metallocenes," with no reference to the presence or absence of bridging groups, it will be understood that such metallocenes include both bridged and unbridged metallocenes as defined herein.

The bridging groups of the inventive bridged metallocenes may be any group of atoms or molecules which will serve to link the pi-bonded cyclopentadienyl-containing ligands as described above. Those commonly employed in the art are satisfactory and include, for example, dialkyl, alkylaryl or diaryl silicon or germanium radicals, alkyl and/or aryl phosphine or amine radicals; or a substituted or unsubstituted hydrocarbyl radical such as methylene, ethylene, propylidene, and the like, and which may also be substituted with substituents selected from alkyl and aryl radicals having from 1 to 20 carbon atoms, and silyl radicals. For the purposes of this patent specification, groups which link pi-bonded cyclopentadienyl-containing ligands are bridging groups, and the bridging groups in bridged metallocenes are not considered to be substituents, and do not generate "substituted" ligands as defined herein below. Thus, bridged metallocenes may also be unsubstituted, even though the bridging group may require replacement of hydrogen radicals on the cyclopentadienyl-containing ligands.

The term "substituted" as used in this specification, and in the claims, is meant to indicate the replacement of one or more hydrogen radicals on any ring of the cylcopentadienyl-containing ligands with one or more non-hydrogen radicals such that the non-hydrogen radicals do not form a ring, although they may contain a pendant ring. For example, the replacement of two hydrogen radicals on the cyclopentadienide group with the four-carbon diradical —(CH$_2$—CH$_2$—CH$_2$—CH$_2$)— to form tetrahydroindenyl does not create a substituted ligand as defined herein, but rather an unsubstituted fused-ring cyclopentadienyl ligand. On the other hand, substitution of one or more hydrogen radicals on the cyclopentadienide group with cyclohexyl radicals does create a substituted ligand. It will be understood by those skilled in the art that "replacement of one or more hydrogen radicals" does not require direct replacement of a hydrogen radical on a cyclopentadienyl-containing ligand, although it may be so accomplished. For example, the starting materials used to prepare the substituted fused-ring cyclopentadienyl and mono-cyclic cyclopentadienyl ligands may already be substituted with non-hydrogen radicals, either by direct replacement of a hydrogen radical, or by virtue of having been prepared from substituted starting materials themselves.

Substituents are selected independently and without any limitation as to number except that which is dictated by the number of replaceable hydrogens on the cyclopentadienyl-containing ligands. Suitable substituents for the ligands of the invention are, for example, $C_1$–$C_{20}$ hydrocarbyl radicals including $C_1$–$C_{20}$ linear and branched alkyl radicals such as methyl, ethyl, propyl, butyl, pentyl, hexyl, heptyl, octyl, nonyl, decyl, $C_1$–$C_{20}$ hydrocarbyl-substituted and unsubstituted cyclic aliphatic and polycyclic aliphatic radicals such as cyclopropyl, cyclobutyl, cyclopentyl, cyclohexyl, phenylcyclohexyl, methylcyclohexyl, cycloheptyl, cyclooctyl, cyclodecyl, cyclododecyl, isopropyldodecyl, adamantyl, norbornyl, tricyclo[5.2.1.0]decyl; $C_1$–$C_{20}$ hydrocarbyl-substituted and unsubstituted aryl radicals including phenyl, methylphenyl, trimethylphenyl, cyclohexylphenyl, napthyl, butylphenyl, butyldimethylphenyl; C1–20 substituted hydrocarbyl radicals including benzyl, N,N-dimethylaminobenzyl, N,N-dimethylaminomethyl, methoxymethyl, diphenylphosphinomethyl, fluorophenyl, trifluoromethylphenyl, fluoromethyl, cyanoethyl; C1–20 linear and branched halocarbyl radicals including trifluoromethyl, perfluoroethyl, perfluoropropyl, perfluorobutyl, perfluorophenyl, chlorodifluoromethyl, chlorotetrafluorophenyl, bromotetrafluorophenyl, iodotetrafluorophenyl; $C_1$–$C_{20}$ substituted-halocarbyl radicals such as methyltetrafluorophenyl, N,N-dimethyldifluoromethyl, methoxyperflouroethyl; $C_1$–$C_{20}$ hydrocarbyl-substituted organometalloid radicals including trimethylsilyl, trimethylgermyl, triphenylsilyl, triphenylgermyl; $C_1$–$C_{20}$ halocarbyl-substituted organometalloid radicals including tris(trifluoromethyl)silyl, tris(trifluoromethyl)gerrnyl, tris(perfluorophenyl)silyl, tris(perfluorophenyl)germyl; $C_1$–$C_{20}$ hydrocarbyl-substituted boron radicals including dimethylboranyl, diphenylboranyl; C1–20 hydrocarbyl-substituted pnictogen radicals including N,N-dimethylamino, diphenylamino, diphenylphosphino, dimethylphosphino; $C_1$–$C_{20}$ hydrocarbyl-substituted chalcogen radicals including methoxy, ethoxy, butoxy, phenoxy, methylthio, ethylthio, phenylthio, and halogen radicals including fluoro, chloro, bromo, and iodo.

The ligands of the inventive metallocenes which are not cyclopentadienyl-containing ligands are selected independently and may be any of those known in the art to form complexes with transition metal atoms. They may be monatomic or polyatomic, or both, and include, for example univalent anionic ligands such as hydride or halides, $C_1$–$C_{20}$ hydrocarbyl radicals including $C_1$–$C_{20}$ linear and branched alkyl radicals such as methyl, ethyl, propyl, butyl, pentyl, hexyl, heptyl, octyl, nonyl, decyl, $C_1$–$C_{20}$ hydrocarbyl-substituted and unsubstituted cyclic aliphatic and polycyclic aliphatic radicals such as cyclopropyl, cyclobutyl, cyclopentyl, cyclohexyl, phenylcyclohexyl, methylcyclohexyl, cycloheptyl, cyclooctyl, cyclodecyl, cyclodocecyl, isopropyldodecyl, adamantyl, norbornyl, tricyclo[5.2.1.0]decyl, $C_{1-20}$ hydrocarbyl-substituted and unsubstituted aryl radicals including phenyl, methylphenyl, trimethylphenyl, cyclohexylphenyl, butylphenyl, butyldimethylphenyl; $C_{1-20}$ substituted hydrocarbyl radicals including benzyl, N,N-dimethylaminobenzyl, N,N-dimethylaminomethyl, methoxyhexyl, diphenylphosphinodecyl, fluorophenyl, trifluoromethylphenyl, fluoromethyl; $C_{1-20}$ hydrocarbyl-substituted organometalloid radicals including trimethylsilyl, trimethylgermyl, triphenylsilyl, triphenylgermyl; $C_{1-20}$ halocarbyl-substituted organometalloid radicals including tris(trifluoromethyl)silyl, tris(trifluoromethyl) germyl, tris(perfluorophenyl)silyl, tris(perfluorophenyl) germyl and the like.

The metallocenes of the inventive process can be made using synthetic methods and fused-ring and mono-cyclic cyclopentadienyl ligands which are well known in the art. For example, substituted and unsubstituted cyclopentadienyl, indenyl, tetrahydroindenyl, and fluorenyl ligands and methods of making each are well known. Preferred fused-ring cyclopentadienyl ligands are indenyl and fluorenyl. A preferred mono-cyclic cyclopentadienyl ligand is the cyclopentadienide group itself. Methods of incorporating the cyclopentadienyl-containing ligands into metallocenes are also well in the art and include, for example, reacting a cyclopentadienyl-containing ligand with an alkali metal alkyl to form an alkali metal complex thereof, followed by subsequent reaction of the alkali metal complex with transition metal compound to transfer one or more cyclopentadienyl-containing groups to the transition metal.

Non-limiting examples of the biscyclopentadienyl metallocenes of the invention include (cyclopentadienyl)(indenyl) zirconium dichloride, (cyclopentadienyl)(indenyl) zirconium dibromide, (cyclopentadienyl)(indenyl) zirconium diiodide, (cyclopentadienyl)(indenyl) zirconium dimethyl, (cyclopentadienyl)(indenyl) zirconium diethyl, (cyclopentadienyl)(indenyl) zirconium dipropyl, (cyclopentadienyl)(indenyl) zirconium dibutyl, (cyclopentadienyl)(tetrahydroindenyl) zirconium dichloride, (cyclopentadienyl)(tetrahydroindenyl) zirconium dibromide, (cyclopentadienyl)(tetrahydroindenyl) zirconium diiodide, (cyclopentadienyl)(tetrahydroindenyl) zirconium dimethyl, (cyclopentadienyl)(tetrahydroindenyl) zirconium diethyl, (cyclopentadienyl)(tetrahydroindenyl) zirconium dipropyl, (cyclopentadienyl)(tetrahydroindenyl) zirconium dibutyl (cyclopentadienyl)(fluorenyl) zirconium dichloride, (cyclopentadienyl)(fluorenyl) zirconium dibromide, (cyclopentadienyl)(fluorenyl) zirconium diiodide, (cyclopentadienyl)(fluorenyl) zirconium dimethyl, (cyclopentadienyl)(fluorenyl) zirconium diethyl, (cyclopentadienyl)(fluorenyl) zirconium dipropyl, (cyclopentadienyl)(fluorenyl) zirconium dibutyl, (n-butylcyclopentadienyl)(indenyl) zirconium dichloride, (n-butylcyclopentadienyl)(indenyl) zirconium dibromide, (n-butylcyclopentadienyl)(indenyl) zirconium diiodide, (n-butylcyclopentadienyl)(indenyl) zirconium dimethyl, (n-butylcyclopentadienyl)(indenyl) zirconium diethyl, (n-butylcyclopentadienyl)(indenyl) zirconium dipropyl, (n-propylcyclopentadienyl)(indenyl) zirconium dibutyl, (n-propylcyclopentadienyl)(fluorenyl) zirconium diiodide, (n-propylcyclopentadienyl)(fluorenyl) zirconium dimethyl, (n-propylcyclopentadienyl)(fluorenyl) zirconiumn diethyl, (n-propylcyclopentadienyl)(fluorenyl) zirconium dipropyl, (n-propylcyclopentadienyl)(fluorenyl) zirconium dibutyl, (pentamethycyclopentadienyl)(indenyl) zirconium dichloride, (pentamethycyclopentadienyl)(indenyl) zirconium dibromide, (pentamethycyclopentadienyl)(indenyl) zirconium diiodide, (pentamethycyclopentadienyl)(indenyl) zirconium dimethyl, (pentamethycyclopentadienyl)(indeny) zirconium diethyl, (pentamethycyclopentadienyl)(indenyl) zirconium dipropyl, (pentamethycyclopentadienyl)(indenyl) zirconium dibutyl, (pentamethycyclopentadienyl)(fluorenyl) zirconium diiodide, (pentamethycyclopentadienyl) (fluorenyl) zirconium dimethyl, (pentamethycyclopentadienyl)(fluorenyl) zirconium diethyl, (pentamethycyclopentadienyl)(fluorenyl) zirconium dipropyl, (cyclopentadienyl)(indenyl) titanium dichloride, (cyclopentadienyl)(indenyl) titanium dibromide, (cyclopentadienyl)(indenyl) titanium diiodide, (cyclopentadienyl)(indenyl) titanium dimethyl, (cyclopentadienyl)(indenyl) titanium diethyl, (cyclopentadienyl)(indenyl) titanium dipropyl, (cyclopentadienyl)(indenyl) titanium dibutyl, (cyclopentadienyl)(tetrahydroindenyl) titanium dichloride, (cyclopentadienyl)(tetrahydroindenyl) titanium dibromide, (cyclopentadienyl)(tetrahydroindenyl) titanium diiodide, (cyclopentadienyl)(tetrahydroindenyl) titanium dimethyl, (cyclopentadienyl)(tetrahydroindenyl) titanium diethyl, (cyclopentadienyl)(tetrahydroindenyl) titanium dipropyl, (cyclopentadienyl)(tetrahydroindenyl) titanium dibutyl (cyclopentadienyl)(fluorenyl) titanium dichloride, (cyclopentadienyl)(fluorenyl) titanium dibromide, (cyclopentadienyl)(fluorenyl) titanium diiodide, (cyclopentadienyl)(fluorenyl) titanium dimethyl, (cyclopentadienyl)(fluorenyl) titanium diethyl, (cyclopentadienyl)(fluorenyl) titanium dipropyl, (cyclopentadienyl)(fluorenyl) titanium dibutyl, (n-butylcyclopentadienyl)(indenyl) titanium dichloride, (n-butylcyclopentadienyl)(indenyl) titanium dibromide, (n-butylcyclopentadienyl)(indenyl) titanium diiodide (n-butylcyclopentadienyl)(indenyl) titanium dimethyl, (n-butylcyclopentadienyl)(indenyl) titanium diethyl, (n-butylcyclopentadienyl)(indenyl) titanium dipropyl, (n-propylcyclopentadienyl)(indenyl) titanium dibutyl, (n-propylcyclopentadienyl)(fluorenyl) titanium diiodide, (n-propylcyclopentadienyl)(fluorenyl) titanium dimethyl, (n-propylcyclopentadienyl)(fluorenyl) titanium diethyl, (n-propylcyclopentadienyl)(fluorenyl) titanium dipropyl, (n-propylcyclopentadienyl)(fluorenyl) titanium dibutyl, (pentamethycyclopentadienyl)(indenyl) titanium dichloride, (pentamethycyclopentadienyl)(indenyl) titanium dibromide, (pentamethycyclopentadienyl)(indenyl) titanium diiodide, (pentamethycyclopentadienyl)(indenyl) titanium dimethyl, (pentamethycyclopentadienyl)(indenyl) titanium diethyl, (pentamethycyclopentadienyl)(indenyl) titanium dipropyl, (pentamethycyclopentadienyl)(indenyl) titanium dibutyl, (pentamethycyclopentadienyl)(fluorenyl) titanium diiodide, (pentamethycyclopentadienyl)(fluorenyl) titanium dimethyl, (pentamethycyclopentadienyl)(fluorenyl) titanium diethyl, (pentamethycyclopentadienyl)(fluorenyl) titanium dipropyl, (pentamethycyclopentadienyl)(fluorenyl) titanium dibutyl, (cyclopentadienyl)(indenyl) hafnium dichloride, (cyclopentadienyl)(indenyl) hafnium dibromide, (cyclopentadienyl)(indenyl) hafnium diiodide, (cyclopentadienyl)(indenyl) hafnium dimethyl, (cyclopentadienyl)(indenyl) hafnium diethyl, (cyclopentadienyl)(indenyl) hafnium dipropyl, (cyclopentadienyl)(indenyl) hafnium dibutyl, (cyclopentadienyl)(tetrahydroindenyl) hafnium dichloride, (cyclopentadienyl)(tetrahydroindenyl) hafnium dibromide, (cyclopentadienyl)(tetrahydroindenyl) hafnium diiodide, (cyclopentadienyl)(tetrahydroindenyl) hafnium dimethyl, (cyclopentadienyl)(tetrahydroindenyl) hafnium diethyl, (cyclopentadienyl)(tetrahydroindenyl) hafnium dipropyl, (cyclopentadienyl)(tetrahydroindenyl) hafnium dibutyl (cyclopentadienyl)(fluorenyl) hafnium dichloride, (cyclopentadienyl)(fluorenyl) hafinum dibromide, (cyclopentadienyl)(fluorenyl) hafnium diiodide, (cyclopentadienyl)(fluorenyl) hafnium dimethyl, (cyclopentadienyl)(fluorenyl) hafnium diethyl, (cyclopentadienyl)(fluorenyl) hafnium dipropyl, (cyclopentadienyl)(fluorenyl) hafnium dibutyl, (n-butylcyclopentadienyl)(indenyl) hafnium dichloride (n-butylcyclopentadienyl)(indenyl) hafnium dibromide, (n-butylcyclopentadienyl)(indenyl) hafnium diiodide, (n-butylcyclopentadienyl)(indenyl) hafnium dimethyl, (n-butylcyclopentadienyl)(indenyl) hafnium diethyl, (n-butylcyclopentadienyl)(indenyl) hafnium dipropyl, (n-propylcyclopentadienyl)(indenyl) hafnium dibutyl, (n-propylcyclopentadienyl)(fluorenyl) hafnium diodide, (n-propylcyclopentadienyl)(fluorenyl) hafnium dimethyl, (n-propylcyclopentadienyl)(fluorenyl) hafnium diethyl, (n-propylcyclopentadienyl)(fluorenyl) hafnium dipropyl, (n-propylcyclopentadienyl)(fluorenyl) hafnium dibutyl, (pentamethycyclopentadienyl)(indenyl) hafnium dichloride, (pentamethycyclopentadienyl)(indenyl) hafnium dibromide, (pentamethycyclopentadienyl)(indenyl) hafiium diiodide, (pentamethycyclopentadienyl)(indenyl) hafnium dimethyl, (pentamethycyclopentadienyl)(indenyl) hafnium diethyl, (pentamethycyclopentadienyl)(indenyl) hafnium dipropyl, (pentamethycyclopentadienyl)(indenyl) hafnium dibutyl, (pentamethycyclopentadienyl)(fluorenyl) hafnium diiodide, (pentamethycyclopentadienyl)(fluorenyl) hafnium dimethyl, (pentamethycyclopentadienyl)(fluorenyl) hafnium diethyl, (pentamethycyclopentadienyl)(fluorenyl) hafnium dipropyl, dimethylsilyl(cyclopentadienyl)(indenyl) zirconium dichloride, dimethylsilyl(cyclopentadienyl)(indenyl) zirconium dibromide, dimethylsilyl(cyclopentadienyl)(indenyl) zirconium diiodide, dimethylsilyl(cyclopentadienyl) (indenyl) zirconium dimethyl, diphenylmethyene (cyclopentadienyl)(indenyl) zirconium diethyl, diphenylmethyene(cyclopentadienyl)(indenyl) zirconium dipropyl, diphenylmethyene(cyclopentadienyl)(indenyl) zirconium dibutyl, diphenylmethyene(cyclopentadienyl) (tetrahydroindenyl) zirconium dichloride, diphenylmethyene(cyclopentadienyl)(tetrahydroindenyl) zirconium dibromide, diphenylmethyene(cyclopentadienyl) (tetrahydroindenyl) zirconium diiodide, diphenylmethyene (cyclopentadienyl)(tetrahydroindenyl) zirconium dimethyl, diphenylmethyene(cyclopentadienyl)(tetrahydroindenyl) zirconium diethyl, diphenylmethyene(cyclopentadienyl) (tetrahydroindenyl) zirconium dipropyl, isopropylidene (cyclopentadienyl)(tetrahydroindenyl) zirconium dibutyl isopropylidene(cyclopentadienyl)(fluorenyl) zirconium dichloride, isopropylidene(cyclopentadienyl)(fluorenyl) zirconium dibromide, isopropylidene(cyclopentadienyl) (fluorenyl) zirconium diiodide, isopropylidene (cyclopentadienyl)(fluorenyl) zirconium dimethyl, isopropylidene(cyclopentadienyl)(fluorenyl) zirconium diethyl, isopropylidene(cyclopentadienyl)(fluorenyl) zirconium dipropyl, and isopropylidene(cyclopentadienyl) (fluorenyl) zirconium dibutyl.

In a particularly preferred embodiment, the process of the invention comprises contacting, under gas-phase or slurry polymerization conditions, a) ethylene; b) optionally, one or more comonomers; and c) a metallocene catalyst system comprising i) a support material and ii) a catalytic complex formed by activating a Group 3, 4, 5, or 6 unbridged biscyclopentadienyl metallocene, wherein said unbridged biscyclopentadienyl metallocene comprises an unsubstituted or substituted fused-ring cyclopentadienyl ligand and an unsubstituted or substituted mono-cyclic cyclopentadienyl ligand. The unbridged biscyclopentadienyl metallocene is preferably a Group 4 unbridged biscyclopentadienyl metallocene. More preferably, the metallocene is a Group 4 unbridged biscyclopentadienyl metallocene, the unsubstituted or substituted fused-ring cyclopentadienyl ligand is unsubstituted or substituted indenyl or fluorenyl, and the unsubstituted or substituted mono-cyclic cyclopentadienyl ligand is unsubstituted or substituted cyclopentadienyl. Yet more preferably the unbridged biscyclopentadienyl metallocene is a Group 4 unbridged biscyclopentadienyl metallocene comprising a substituted or unsubstituted indenyl group and an unsubstituted or substituted mono-cyclic cyclopentadienyl ligand. Still more preferably, the unbridged Group 4 biscyclopentadienyl metallocene is (cyclopentadienyl)(indenyl) zirconium dichloride, (cyclopentadienyl)(indenyl) titanium dichloride, or (cyclopentadienyl)(indenyl) hafnium dichloride. Most preferably it is (cyclopentadienyl)(indenyl) zirconium dichloride.

The process of the invention employs a catalytic complex formed by activating a Group 3, 4, 5, or 6 biscyclopentadienyl metallocene. As used herein "catalytic complex" means any species capable of polymerizing olefins. "Activation" or "activating" means the process or act of bringing a metallocene and an activator into such proximity that a catalytic complex is formed. The group 3, 4, 5, or 6 biscyclopentadienyl metallocene of the invention may be activated by use of the traditional means of activation, specifically including the use of alkyl alumoxane compounds as activators, and ionizing activators, such as those represented by aryl-substituted boron compounds such as nitrogen-containing salts, carbenium, silylium or phosphonium salts, metal salts and neutral Lewis acid compounds. Each method is well-documented in the field of metallocene art. Related means of activation, such as the use of alkyl aluminum or other metal alkyl alkylating agents to convert metallocene halide compounds to hydride or alkyl group-containing compounds prior to activation with the ionizing activator compounds, will be suitable in accordance with the instant invention. For example, it will be understood by those skilled in the art that if ionizing activator compounds are to be used with metallocene halides which do not contain ligands reactive toward ionizing activators, such metallocenes may be treated with alkylating agents to incorporate such reactive ligands, and that this step is one of the steps necessary to form a catalytic complex by ionic activation in these circumstances.

In one embodiment, the metallocene catalyst system of the invention may comprise one or more additional different metallocenes, or other classes of olefin polymerization catalysts, for example the well-known Ziegler-Natta catalysts based on transition metal halides, to achieve broadened, bimodal, or multimodal MWD weight polymers capable of improved processing or properties. Also, use of the inventive metallocenes with another metallocene capable of narrow MWD and low MIR, but having lower comonomer incorporation capacity, should yield polymers having a narrow MWD and a broadened composition distribution (CD). Thus, in one embodiment, the metallocene catalyst system of the inventive process may comprise catalytic complexes derived from two metallocenes. In the preferred such embodiment, the metallocene catalyst system of the inventive process further comprises a catalytic complex formed by activating a metallocene of the general formula:

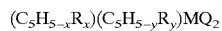

wherein:

M is a Group 4 metal;

$(C_5H_{5-x}R_x)$ and $(C_5H_{5-y}R_y)$ are independently a cyclopentadienyl ring containing five carbon atoms and substituted with from zero to five R radicals;

x is from 0 to 5 denoting the degree of substitution, y is from 0 to 5 denoting the degree of substitution, and x+y equals 4, 5, 6, 7, or 8;

each R substituent is, independently, a radical group which is a $C_{1-20}$ hydrocarbyl, substituted hydrocarbyl, halocarbyl, or substituted halocarbyl, hydrocarbyl-substituted organometalloid, halocarbyl-substituted organometalloid radical, disubstituted boron, disubstituted pnictogen, substituted chalcogen, or halogen or two adjacent R groups are joined forming a $C_4$ to $C_{30}$ ring to give a saturated or unsaturated polycylic cyclopentadienyl ligand]; and Q are independently, hydride radicals, hydrocarbyl radicals, substituted hydrocarbyl radicals, halocarbyl radicals, substituted halocarbyl radicals, and hydrocarbyl- and halocarbyl-substituted organometalloid radicals, an anionic univalent ligand, halogen, alkoxide radicals, aryloxide radicals, amide radicals, phosphide radicals or a combination thereof, or two Q are joined and bound to the metal atom to form a metallacycle ring containing from about 3 to about 20 carbon atoms or an alkylidene.

Preferred metallocene catalyst systems which comprise catalytic complexes derived from two metallocenes according to the embodiment described immediately above include the use of $(Me_5Cp)(n-PrCp)ZrCl_2$ or bis(1,3-methyl-n-butylcyclopentadienyl) zirconium dichloride in combination with (cyclopentadienyl)(indenyl)$ZrCl_2$.

The catalysts according to the invention are particularly suited to use in known gas phase or slurry copolymerization processes where heterogeneous catalysts are typically used. The heterogeneous catalysts of the invention are typically supported on inert support particles, which may be formed from inorganic solid materials, such as inorganic chlorides or inorganic refractory oxides, or polymeric materials, which are then used in a gas phase or liquid process wherein one or more of the monomers are contacted with the supported catalysts. The teachings and descriptions of the background art are incorporated by reference for purposes of U.S. patent practice and are specific to process conditions and reagents useful with the metallocene or mono-metallocene catalyst systems of this invention.

The use of organometallic compounds as scavenging compounds in the heterogeneous processes of the invention will also be suitable. Alkyl aluminum compounds such as triethyl aluminum, triisobutyl aluminum, tri-n-octyl aluminum, methylalumoxane and isobutylalumoxane are well-known in the art. Such should be minimized or avoided altogether if conditions permit so as to avoid activity decreases, possible chain-transfer mechanisms and deleterious fouling where the amount of scavenger compounds exceed that of the adventitious impurities present.

Suitable gas phase processes are illustrated U.S. Pat. Nos. 4,543,399, 4,588,790, 5,028,670, 5,352,749, 5,382,638, 5,405,922, 5,422,999, 5,436,304, 5,453,471, and 5,463,999, and International applications WO 94/28032, WO 95/07942 and WO 96/00245. Each is incorporated by reference for purposes of U.S. patent practice. Typically the processes are conducted at temperatures of from about 100° C. to 150° C., preferably from about 40° C. to 120° C., at pressures up to about 7000 kPa, typically from about 690 kPa to 2415 kPa. Continuous processes using fluidized or stirred beds and recycle streams as the fluidizing medium are preferred.

Slurry polymerization processes in which the immobilized metallocene of mono-metallocene catalyst systems of this invention may be used are typically described as those in which the polymerization medium can be either a liquid monomer, like propylene, or a hydrocarbon solvent or diluent, advantageously aliphatic paraffin such as propane, butane, isobutane, isopentane, hexane, heptane, cyclohexane, etc. or an aromatic one such as toluene. The polymerization temperatures may be those considered low, e.g., less than 50° C., preferably 0–30° C., or may be in a higher range, such as up to about 150° C., preferably from 50° C. up to about 120° C., or at any ranges between the end points indicated. Pressures can vary from about 100 to about 700 psia (0.76–4.8 MPa). Additional description is given in U.S. Pat. Nos. 5,274,056 and 4,182,810 and WO 94/21962 which are incorporated by reference for purposes of U.S. patent practice.

The polymerization process of present invention may optionally employ one or more comonomers to form copolymers. The comonomer is provided to the polymerization process and thus incorporated into the growing polymer chain to disrupt ethylene crystallinity and thereby modify the properties of the polymer. As is well known, when comonomer is provided to the process, a comonomer to ethylene ratio is established, and as more comonomer is provided relative to the ethylene, this ratio becomes higher and more comonomer is incorporated into the polymer with the result that the polymer crystallinity and density is lowered. Polymer density is a direct measure of polymer crystallinity and can be determined using standardized methods well known to the art. Thus, by controlling the relative amounts of comonomer and ethylene provided to the polymerization process, the density of the polymers produced may be adjusted to the desired levels.

In the inventive process, the provided comonomer serves to lower the density of the polymer below that observed for the corresponding ethylene homopolymer, which is prepared in the absence of comonomer. Higher ratios of comonomer to ethylene will produce lower density polymers and the ratio of comonomer to ethylene needed to achieve a given density can readily be determined by those skilled in the art. For example, during continuous or semi-continuous ethylene polymerization operations, the density of the polymer being produced is typically regularly measured by securing samples of the polymer as it is discharged from the process, drying the samples if necessary, and measuring the density of the samples according to well known methods, such as, for example, those set forth in ASTM D 1505. By noting the trends in the density of the polymer samples over time, more or less comonomer can be provided to the process, thereby adjusting the ratio of comonomer to ethylene in the process to produce a polymer having the desired density. Similar procedures are used in batch polymerization processes, where varying ratios of comonomer to ethylene would typically be established in the process near the outset of the polymerization run, and, if necessary, adjusted either upward or downward in the next run according to the density results obtained. The ratio of comonomer to ethylene can be measured using techniques and equipment well known in the art, for example on-line gas chromatography.

Suitable comonomers for the process of the instant invention are the olefinically unsaturated compounds which include, for example, the $C_1$–$C_{20}$ α-olefins such as 1-butene, 1-pentene, 1-hexene, 1-octene, 1-decene, 1-dodecene; and branched 1-olefins such as 3 methyl-1-butene, 3-methyl-l-pentene and 4-methyl-styrene-1-pentene, and vinyl-terminated polymers and oligomers such as those having up to 250 carbon atoms and higher. Cyclic olefins will also be suitable, especially $C_5$ to $C_{20}$ cyclic olefins including cyclopentene, norbornene, methylnorbornene, ethylnorbornene, and cyclododecene. Vinyl aromatics, e.g., styrene and alkyl-substituted styrenes are also suitable.

The process in accordance with the invention is particularly useful for the production of high density and medium density ethylene polymers. Medium density ethylene polymers, known as medium density polyethylene (MDPE), are defined herein as those polymers having densities equal to or greater than 0.925, but less than 0.940 g/cc. High density ethylene polymers, which are traditionally known as high-density polyethylene (HDPE), are defined herein to include those grades where the density is equal to or above 0.940 g/cc. Preferably the MDPE polymers made by the inventive process will have a density equal to or greater than 0.925 g/cc, but less than 0.940, more preferably equal to or greater than about 0.930, but less than 0.940 g/cc, and still more preferably greater than or equal to about 0.935, but less than 0.940 g/cc. Preferably the HDPE polymers made by the inventive process will have a density equal to or greater than 0.940 g/cc, more preferably equal to or greater than about 0.945 g/cc, and most preferably greater than or equal to about 0.950 g/cc. As used herein in connection with polymer density, "about" means within plus or minus 0.002 g/cc.

Thus, in a preferred embodiment, the process of the invention further comprises adjusting the ratio of comonomer to ethylene in the process to produce a polymer having a density greater than about 0.925 g/cc, preferably greater than about 0.930, more preferably greater than about 0.935, even more preferably greater than about 0.940 g/cc, yet more preferably greater than about 0.945 g/cc, and most preferably greater than or equal to about 0.950 g/cc. Another embodiment of the present invention is the process as defined above wherein no comonomer is contacted with the ethylene and the metallocene or mono-metallocene catalyst system. It will be understood that in this embodiment a homopolymer is produced, corresponding to the option of introducing no comonomer to the process.

The process of the present invention is also useful for producing those polymers known as plastomers and LLDPE, which have densities in the range of from about 0.865 to about 0.915 g/cc in the case of plastomers, and from about 0.915 to about 0.925 g/cc in the case of LLDPE. Thus, in yet another embodiment, the process of the invention further comprises adjusting the ratio of comonomer to ethylene in the process to produce a polymer having a density in the range of from about 0.865 to about 0.925 g/cc.

The inventive process produces narrow molecular weight distribution products. As is well known in the art, a useful index of molecular weight distribution is the ratio of two melt-mass flow rates measured at 190° C. in an extrusion plastometer, one under high load conditions and one under low load conditions. Various load conditions have been employed for this purpose, but often a weight of 21.6 kg is employed in the high load condition, and 2.16 kg is used in the low load condition. These conditions correspond to ASTM D 1238, conditions F and E, respectively. The most current version of ASTM D 1238, ASTM D 1238-95, now designates these conditions as "Condition 190/21.6" and "Condition 190/2.16" respectively. The melt-mass flow rates measured under 21.6 kg and 2.16 kg loads have been known in the art respectively as HLMI (high load melt index), or $I_{21}$, and MI (melt index), or $I_2$. In this patent specification, $I_2$ will be referred to as melt index which may be abbreviated as "MI". The new, preferred designation for "HLMI" according to ASTM D 1238-95 is "FR-190/21.6," but for the purposes of this patent specification the term "HLMI" will be used. The ratio HLMI/MI, or $I_{21}/I_2$, is often referred to as "MIR" or "MFR" which mean "melt index ratio" and "melt flow ratio," respectively. In this context, "MFR" is not to be confused with the melt-mass flow rate of polypropylenes measured under ASTM D 1238-95 Condition 230/2.16, which has also been commonly referred to as "MFR" in the polypropylene art. Herein, "MIR" will be used to refer to the ratio HLMI/MI. Lower MIR is indicative of narrower molecular weight distributions. Thus, in yet another embodiment, the inventive process further comprises recovering a polymer having an MIR less than 35, preferably less than 30, more preferably less than 25, and still more preferably less than 20.

The metallocene and mono-metallocene catalyst systems of the inventive process comprise a support. Any effective method of supporting coordination catalyst systems may be used to incorporate the support, effective meaning that the catalyst system so prepared can be used for preparing polymer in a gas phase or slurry polymerization process. For purposes of this patent specification the terms "carrier" or "support" are interchangeable and can be any support material, preferably a porous support material, such as for example, talc, inorganic oxides, inorganic chlorides, for example magnesium chloride and resinous support materials such as polystyrene, polyolefin or polymeric compounds, or any other organic support material, and the like, that has an average particle size greater than 10 μm.

The preferred support materials are inorganic oxide materials, which include those from the Periodic Table of Elements of Groups 2, 3, 4, 5, 13 or 14 metal oxides. In a preferred embodiment, the catalyst support materials include silica, alumina, silica-alumina, and mixtures thereof. Other inorganic oxides that may be employed either alone or in combination with the silica, alumina or silica-alumina are magnesia, titania, zirconia, and the like.

It is preferred that the carrier of the catalyst of this invention has a surface area in the range of from about 10 to about 700 m$^2$/g, pore volume in the range of from about 0.1 to about 4.0 cc/g and average particle size in the range of from about 10 to about 500 μm. More preferably, the surface area is in the range of from about 50 to about 500 m$^2$/g, pore volume of from about 0.5 to about 3.5 cc/g and average particle size of from about 20 to about 200 μm. Most preferably the surface area range is from about 100 to about 400 m$^2$/g, pore volume from about 0.8 to about 3.0 cc/g and average particle size is from about 30 to about 100 μm. The pore size of the carrier of the invention typically has pore size in the range of from 10 to 1000 Å, preferably 50 to about 500 Å, and most preferably 75 to about 350 Å.

The supported metallocene or mono-metallocene catalyst systems of the invention can be made in a variety of different ways. For the purposes of this patent specification and appended claims the term "solution" includes a suspension, a slurry or a dry solid mixture. Any compatible solvent or other liquid capable of forming a solution or the like with at least one metallocene catalyst component and/or at least one activator of the invention can be used. Non-limiting examples of solvents are those aliphatic, aromatic and saturated hydrocarbons and cyclic hydrocarbons, such as isopentane, heptane, toluene and the like. The more preferred solvents are the cyclic aliphatic and aromatic hydrocarbons, the most preferred of which is toluene.

The catalysts of the present invention which are activated by alumoxanes, as well as those which are activated by ionizing actvators, may be supported. PCT publications WO 94/03506, WO 93/11172, and WO 96/04319 disclose preferred methods of supporting the catalysts of the invention when ionizing activators are used, and all three references are hereby incorporated by reference for the purposes of U.S. patent practice for their respective teachings on methods of supporting catalysts activated by ionizing activators.

In one embodiment, the metallocene catalyst component is typically mixed with a solvent to form a metallocene solution, and a separate solution is formed containing an activator and a solvent. The metallocene solution and the activator solution are then added to a porous support, or vice-versa, or any combination thereof. In a preferred embodiment, the metallocene and the activator solutions are combined and then added to a porous support.

In another embodiment, the metallocene solution is added to the porous support first before the addition of the activator solution. In yet another embodiment, the activator solution is added first to the porous support, or vice versa, before the addition of the metallocene solution. In still yet another embodiment, part or all of the metallocene solution can be added to the porous support material, or vice-versa, followed by the addition of all or part of the activator solution. If parts are used the remaining portions of each solution can be added in any order to the porous support.

Furthermore, in one embodiment of the invention the total volume of the metallocene solution and the activator solution or the metallocene and activator solution is less than four times the pore volume of the porous support, more preferably less than three times. Most preferably the total volume of the metallocene solution and the activator solution or the metallocene and activator solution is between one time and three times the total pore volume of the porous support.

Generally, a slurry is formed when two phases are observable one of which contains all or most of the support material. The volume of solution required to reach this stage will vary depending upon among other things the type of support material and type of catalyst system components. Just prior to the point at which a slurry is formed, is a stage which is defined herein as the "mud" stage. At the mud stage, the solution volume is such that, while two phases are not visible, the support material is saturated and the support particles are firmly packed together. Prior to the mud stage, the volume of solution is such that the support material appearance ranges from dry and free flowing (even though the support may contain close to one pore volume of solution) to dry but slightly sticky to variously damp and clumpy such as is the appearance of variously wet sand.

In one embodiment, the volume of solution applied to the support material ranges from above one pore volume to that required to form a slurry, preferably from above one pore volume to that required to reach the mud stage. It should be recognized that catalyst systems formed in the mud stage are more difficult to mix and require longer drying times as compared to those prepared with less solution. Below one pore volume it may be difficult to obtain homogeneous coverage of the support material with the catalyst system components. This may lead to fouling.

The metallocene and mono-metallocene catalyst systems of the invention can be used in slurry form or dried to a free-flowing powder. As a free flowing powder the catalyst systems of the invention can still contain an amount of solvent, for example, toluene, in the support's pores, however, it is preferred that substantially all the solvent is removed. For purposes of this specification and appended claims the term "substantially all the solvent is removed" means that greater than about 90% of all the solvent is removed from the supported catalyst system when drying.

In another embodiment, the dried supported catalyst system is washed or otherwise treated to remove weakly associated catalyst component(s). Any hydrocarbon may be used to wash the catalyst system, however, the hydrocarbon should be capable of dissolving the catalyst component and should be easy to dry from the support. Toluene and hexane are preferred.

It is within the scope of the invention to separately support at least one metallocene on one porous support and support at least one activator on another porous support wherein the total volume of the metallocene solution on the first porous support and the total volume of activator solution is as described above.

The procedure for measuring the total pore volume of a porous support is well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well know in the art is described in Innes, *Total porosity and Particle Density of Fluid Catalysts By Liquid Titration,* Vol. 28, No. 3, Analytical Chemistry 332–334 (March, 1956).

In another embodiment of the invention, the mole ratio of the metal of the activator component to the transition metal of the metallocene component is in the range of ratios between 0.3:1 to 1000:1, preferably 20:1 to 800:1, and most preferably 50:1 to 500:1.

In another embodiment where the activator is an ionizing activator as previously described the mole ratio of the metal of the activator component to the transition metal component is in the range of ratios between 0.3:1 to 3:1.

The supported metallocene or mono-metallocene catalyst systems of the invention may include a surface modifier such as that described in U.S. patent application No. 08/322,675, now abandoned (fully incorporated herein by reference) and/or an antistatic agent, for example, those described in U.S. Pat. No. 5,283,278, fully incorporated herein by reference. Non-limiting examples of antistatic agents include, alcohol, thiol, silanol, diol, ester, ketone, aldehyde, acid, amine, and ether compounds. Tertiary amine compounds are preferred. The antistatic agent can be added at any stage in the formation of the supported metallocene or mono-metallocene catalyst systems of the invention, however, it is preferred that it is added after the supported catalyst systems of the invention are formed, in either a slurry or dried state. In another embodiment of the invention, the supported metallocene and mono-metallocene catalyst systems of the invention include a polyolefin wax or tackifier or the like.

EXAMPLES

In order to provide a better understanding of the present invention, the following examples are offered.

In all of the catalyst preparations, all materials used were anhydrous and oxygen free, and precautions were taken to prevent the introduction of air or moisture into the system.

Preparation of Catalyst in Examples 1–3

Method of Metallocene Preparation

Indenyllithium was prepared from indene and butyllithium, and $CpZrCl_3$ was purchased from Strem Chemicals. Celite was dried under vacuum at about 110° C. In a nitrogen filled glove box a 2 L round bottom flask with magnetic stir bar was charged with 25.27 g (0.0962 mol) of $CpZrCl_3$ and about 800 mL of diethyl ether. Over 10 minutes 11.75 g (0.0962 mol) of indenyllithium was added and the mixture stirred over night. After removing the solvent under vacuum the residue was extracted with about 400 mL toluene, filtered through Celite, washed with toluene, and the combined filtrates stripped to dryness yielding 6.91 g (21% yield) of yellow $CpIndZrCl_2$. The filter bed was washed with methylene chloride until the filtrates were colorless and the solvent removed under vacuum yielding 22.88 g (69% yield) of CpIndZrCl$_2$. This fraction was used to prepare the supported catalyst.

Method of Supported Catalyst Preparation

The catalyst preparation used a two gallon glass walled reactor vessel with a heating/cooling jacket and a helical ribbon blender having a central auger-type shaft. The reactor was warmed to 75° F., and 1140 mL of 30 wt. % aluminoxane in toluene (~0.93 g/mL, 5.48 mol) was added to the reactor followed by 1700 mL of toluene. A suspension of 15.58 g cyclopentadienylindenylzirconium dichloride (CpIndZrCl$_2$) in 490 mL toluene was transferred into the reactor via cannula. Next 146 mL toluene was added to the flask that had contained the suspension and any remaining solids were rinsed into the reactor with the toluene. After this precursor solution stirred 1 hour the mixture was removed from the reactor to a large glass flask and 850 g of silica (MS948, 1.65 cc/g P.V., Davison Chemical Co, dehydrated at 600° C.) added to the reactor. The precursor solution was added back to the reactor, and after 20 min an additional 350 mL toluene was added. Next 6.09 g of surface modifier AS-990 (AS-990 is a commercially available xyloid compound which is 90% N,N-bis(2-hydroxyethyl)octadecylamine) in about 60 mL toluene was added and stirring continued another 30 min. Drying was then begun by feeding a stream of N$_2$ into the bottom of the reactor with stirring, and the temperature was increased to 110° F. After about 18 hr 1094 g of free flowing, dry material was unloaded from the reactor under N$_2$ pressure.

Fluid-Bed Polymerization

The supported catalyst of Examples 1–3 was tested in a continuous gas phase fluidized bed reactor which comprised a nominal 18 inch, schedule 60 reactor having an internal diameter of 16.5 inches. The fluidized bed is made up of polymer granules. The gaseous feed streams of ethylene and hydrogen together with liquid comonomer were mixed together in a mixing tee arrangement and introduced below the reactor bed into the recycle gas line. Hexene was used as a comonomer when comonomer was emplyed. In comparative example C6, triethylaluminum (TEAL) was mixed with the comonomer stream as a 1% by weight solution in isopentane carrier solvent. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentration of all the gases were measured by an on-line gas chromatograph to ensure relatively constant composition in the recycle gas stream.

The solid catalyst was injected directly into the fluidized bed using purified nitrogen as a carrier. Its rate was adjusted to maintain a constant production rate. The reacting bed of growing polymer particles is maintained in a fluidized state by the continuous flow of the make up feed and recycle gas through the reaction zone. A superficial gas velocity of 1–3 ft/sec was used to achieve this. The reactor was operated at a total pressure of 300 psig. To maintain a constant reactor temperature, the temperature of the recycle gas is continuously adjusted up or down to accommodate any changes in the rate of heat generation due to the polymerization. The fluidized bed was maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small steam of humidified nitrogen to deactivate any trace quantities of residual catalyst. The properties of the polymer were determined by the following test methods:

Melt Index: ASTM D-1238—Condition E

Density: ASTM D-1505

Bulk Density: The resin is poured via a ⅞" diameter fimnel into a fixed volume cylinder of 400 cc. The bulk density is measured as the weight of resin divided by 400 cc to give a value in g/cc.

Particle Size: The particle size is measured by determining the weight of material collected on a series of U.S. Standard sieves and determining the weight average particle size based on the sieve series used.

The fines are defined as the percentage of the total distribution passing through a 120 mesh standard sieve. This has a particle size equivalent of 120 microns. Fines are important since high levels can lead to sheeting and fouling of the reaction cycle gas system. This results in heat exchanger distributor plate fouling requiring a reactor shut down to clean out.

The polymerization conditions and results are set forth in Table 1.

TABLE 1

| Example | 1 | 2 | 3 |
|---|---|---|---|
| Temperature (° C.) | 79.4 | 79.4 | 79.4 |
| Pressure (bar) | 21.7 | 21.7 | 21.7 |
| Ethylene (mole %) | 70.0 | 50.0 | 60.1 |
| Hydrogen (mole ppm) | 400 | 500 | 177 |
| Hexene | 0.00 | 0.55 | 0.85 |
| Bed Weight (Kg) | 108.9 | 96.3 | 112.2 |
| Production Rate (Kg/Hr) | 27.6 | 31.0 | 36.3 |
| Catalyst Productivity (Kg/Kg) | 5201 | 9455 | 6829 |
| Residual Zr (ppm) | 0.65 | 0.43 | 0.46 |
| Residual Ash (ppm) | 189 | 107 | 141 |
| Melt Index - MI (dg/min) | 23.8 | 23.2 | 1.32 |
| MIR (I21/I2) | 17.2 | 19.4 | 19.4 |
| Density (g/cc) | 0.9611 | 0.9293 | 0.9165 |
| Bulk Density (g/cc) | 0.358 | 0.334 | 0.399 |
| Average Particle Size (microns) | 624 | 840 | 1106 |
| Fines (% less than 120 microns) | 3.51 | 0.763 | 0.165 |

We claim:

1. A polymerization process comprising contacting, under gas-phase polymerization conditions, a) ethylene;

b) optionally, one or more comonomers; and c) a metallocene catalyst system comprising a support material and a catalytic complex formed by activating a Group 3, 4, 5, or 6 unbridged biscyclopentadienyl metallocene, wherein said unbridged biscyclopentadienyl metallocene comprises an unsubstituted indenyl or tetrahydroindenyl ligand and an unsubstituted monocyclic cyclopentadienyl ligand.

2. The process of claim 1 comprising contacting ethylene, one or more comonomers, and said metallocene catalyst system, said process further comprising adjusting the ratio of comonomer to ethylene to produce a polymer having a density greater than about 0.925 g/cc.

3. The process of claim 1 comprising contacting ethylene, one or more comonomers, and said metallocene catalyst system, said process further comprising adjusting the ratio of comonomer to ethylene to produce a polymer having a density in the range of from about 0.865 to about 0.925 g/cc.

4. The process of claim 1 wherein no comonomer is contacted with said ethylene and said metallocene catalyst system.

5. The process of claim 1 wherein said one or more comonomers comprise an α-olefin.

6. The process of claim 1 wherein said unbridged biscyclopentadienyl metallocene is a Group 4 unbridged metallocene comprising an unsubstituted indenyl or tetrahydroindenyl ligand and an unsubstituted mono-cyclic cyclopentadienyl ligand.

7. The process of claim 6 further comprising recovering a polymer having an MIR less than 35.

8. The process of claim 6 comprising contacting ethylene, one or more comonomers, and said metallocene catalyst system, said process further comprising adjusting the ratio of comonomer to ethylene to produce a polymer having a density greater than about 0.925 g/cc.

9. The process of claim 6 comprising contacting ethylene, one or more comonomers, and said metallocene catalyst system, said process further comprising adjusting the ratio of comonomer to ethylene to produce a polymer having a density in the range of from about 0.865 to about 0.925 g/cc.

10. A polymerization process comprising contacting, under gas-phase polymerization conditions, a) ethylene;
b) optionally, one or more comonomers; and
c) a mono-metallocene catalyst system comprising a support material and a catalytic complex formed by activating a Group 3, 4, 5, or 6 unbridged biscyclopentadienyl metallocene, wherein said unbridged biscyclopentadienyl metallocene comprises an unsubstituted indenyl or tetrahydroindenyl ligand and an unsubstituted mono-cyclic cyclopentadienyl ligand.

11. The process of claim 10 comprising contacting ethylene, one or more comonomers, and said metallocene catalyst system, said process further comprising adjusting the ratio of comonomer to ethylene to produce a polymer having a density greater than about 0.925 g/cc.

12. The process of claim 10 comprising contacting ethylene, one or more comonomers, and said metallocene catalyst system, said process further comprising adjusting the ratio of comonomer to ethylene to produce a polymer having a density in the range of from about 0.865 to about 0.925 g/cc.

13. The process of claim 10 wherein no comonomer is contacted with said ethylene and said biscyclopentadienyl metallocene.

14. The process of claim 10 wherein said one or more comonomers comprise an α-olefin.

\* \* \* \* \*